United States Patent
Takeuchi et al.

(10) Patent No.: US 9,039,288 B2
(45) Date of Patent: May 26, 2015

(54) TAPERED ROLLER BEARING RESIN CAGE AND TAPERED ROLLER BEARING

(75) Inventors: Takumi Takeuchi, Kanagawa (JP); Ryosuke Yamada, Kanagawa (JP); Kinji Yukawa, Kanagawa (JP); Tomoharu Saito, Kanagawa (JP); Hiroki Maejima, Kanagawa (JP); Kimiko Nakai, Kanagawa (JP)

(73) Assignee: NSK LTD., Tokyo (JP)

( * ) Notice: Subject to any disclaimer, the term of this patent is extended or adjusted under 35 U.S.C. 154(b) by 503 days.

(21) Appl. No.: 13/003,085

(22) PCT Filed: Jul. 7, 2009

(86) PCT No.: PCT/JP2009/062395
§ 371 (c)(1),
(2), (4) Date: Feb. 17, 2011

(87) PCT Pub. No.: WO2010/005007
PCT Pub. Date: Jan. 14, 2010

(65) Prior Publication Data
US 2011/0142389 A1    Jun. 16, 2011

(30) Foreign Application Priority Data

Jul. 8, 2008 (JP) ................................. 2008-178218
May 21, 2009 (JP) ................................. 2009-123143

(51) Int. Cl.
*F16C 33/48* (2006.01)
*F16C 33/66* (2006.01)
(Continued)

(52) U.S. Cl.
CPC ......... *F16C 33/6681* (2013.01); *F16C 33/4635* (2013.01); *F16C 33/4682* (2013.01); *F16C 19/364* (2013.01); *F16C 2361/61* (2013.01)

(58) Field of Classification Search
CPC ............. F16C 33/4635; F16C 33/4682; F16C 2361/61; F16C 33/6681
USPC .................. 384/572, 575, 576, 580, 621, 623
See application file for complete search history.

(56) References Cited

U.S. PATENT DOCUMENTS 4,541,743 A * 9/1985 Hatano .......................... 384/576
4,707,152 A * 11/1987 Neese ............................ 384/572
(Continued)

FOREIGN PATENT DOCUMENTS

DE 3605812 A1 8/1987
JP 59-50224 A 3/1984
(Continued)

OTHER PUBLICATIONS

Translation of JP 2008-045711 received on May 8, 2013.*
(Continued)

*Primary Examiner* — Thomas R. Hannon
*Assistant Examiner* — Adam D Rogers
(74) *Attorney, Agent, or Firm* — Sughrue Mion, PLLC

(57) ABSTRACT

There is provided a resin cage of a tapered roller bearing. The cage includes a small diameter annular portion, a large diameter annular portion, and a plurality of bar portions arranged at intervals in a circumferential direction to connect the annular portions. The bar portion has a pair of circumferentially-directed side surfaces, each having a roller guide surface, and an inner-side inner peripheral surface, a circumferential width of which is smaller on a side of the large diameter annular portion than on a side of the small diameter annular portion, and has a roller retaining region in which a radially outer side pocket width and a radially inner side pocket width between the opposed circumferentially-directed side surfaces of the adjacent bar portions are smaller than a diameter of the roller.

2 Claims, 22 Drawing Sheets

(51) Int. Cl.
  *F16C 33/46*  (2006.01)
  *F16C 19/36*  (2006.01)

(56) References Cited

U.S. PATENT DOCUMENTS

| | | | | |
|---|---|---|---|---|
| 5,391,005 A * | 2/1995 | Alling | ............................. | 384/575 |
| 6,659,650 B2 * | 12/2003 | Joki et al. | ...................... | 384/572 |
| 7,134,794 B2 * | 11/2006 | Obayashi | ....................... | 384/623 |
| 7,540,665 B2 * | 6/2009 | Ueno et al. | ..................... | 384/571 |
| 7,955,001 B2 * | 6/2011 | Reed et al. | .................... | 384/580 |
| 8,177,437 B2 * | 5/2012 | Omoto | ............................ | 384/572 |
| 8,641,291 B2 * | 2/2014 | Yamamoto | .................... | 384/576 |
| 2007/0230852 A1 * | 10/2007 | Tabata et al. | .................. | 384/576 |

FOREIGN PATENT DOCUMENTS

| | | |
|---|---|---|
| JP | 60-38922 U | 3/1985 |
| JP | 63-1919 U | 1/1988 |
| JP | 7-25332 U | 5/1995 |
| JP | 10-281164 A | 10/1998 |
| JP | 2004-84799 A | 3/2004 |
| JP | 2005-147308 A | 6/2005 |
| JP | 2006070926 A | 3/2006 |
| JP | 2006-226308 A | 8/2006 |
| JP | 2006-226362 A | 8/2006 |
| JP | 2007-32679 A | 2/2007 |
| JP | 2007-57038 A | 3/2007 |
| JP | 2007-57045 A | 3/2007 |
| JP | 2007170538 A * | 7/2007 |
| JP | 2007-321911 A | 12/2007 |
| JP | 2008-2535 A | 1/2008 |
| JP | 2008045711 A | 2/2008 |
| JP | 2008-51295 A | 3/2008 |

OTHER PUBLICATIONS

Translation of JP 2008-051295 received on May 8, 2013.*
Translation of JP 63001919 received on May 13, 2013.*
Machine translation on JP 2007-321911 obtained on Jul. 9, 2014.*
Office Action, dated Mar. 22, 2013, issued by the German Patent Office in counterpart German Application No. 11 2009 001 651.0.
International Search Report for PCT/JP2009/062395 dated Aug. 11, 2009, 5 pages [PCT/ISA/210].
Written Opinion for PCT/JP2009/062395 dated Aug. 11, 2009, 5 pages [PCT/ISA/237].
Office Action, dated Sep. 13, 2012, issued by the Korean Intellectual Property Office in counterpart Korean Patent Application No. 2011-7000034.

* cited by examiner

TAPERED ROLLER BEARING RESIN CAGE AND TAPERED ROLLER BEARING

TECHNICAL FIELD

The present invention relates to a tapered roller bearing resin cage and a tapered roller bearing, and more particularly, to a tapered roller bearing resin cage and a tapered roller bearing used under a condition where there is plenty of lubricating oil such as in a transmission or a differential gear.

BACKGROUND ART

In relation to conventional tapered roller bearings, various resin cages have been proposed (see, e.g., Patent Documents 1 to 4). For example, according to a cage 101 disclosed in Patent Document 1, as shown in FIGS. 25(a) and 25(b), a radial dimension of a bar portion 102 is enlarged to reduce a volume of space inside a tapered roller bearing 100, thereby reducing an amount of lubricating oil inside the bearing to lower an agitation resistance. Further, in an inner peripheral surface side of the bar portions 102, guide grooves 103 whose diameter is enlarged from a small diameter annular portion to a large diameter annular portion are provided to smooth the flow of the lubricating oil, reduce the amount of lubricating oil staying in the bearing and to improve heat-seizure resistance. Such a structure is similarly provided in a tapered roller bearing cage disclosed in Patent Document 2.

Further, according to this cage 101, opening widths W1, W2 in the circumferential direction in an outer peripheral side and an inner peripheral side of each pocket 104 are respectively smaller than a diameter R of a tapered roller 105 in a corresponding position to hold the tapered roller 105 in an embracing manner, so that the tapered roller 105 is prevented from falling from the cage 101. Such a structure is similarly provided in tapered roller bearing resin cages disclosed in Patent Documents 3 and 4.

PRIOR ART DOCUMENTS

Patent Documents

Patent Document 1: JP 2004-84799 A
Patent Document 2: JP 2008-51295 A
Patent Document 3: JP 59-50224 B2
Patent Document 4: JP 63-1919 Y2

SUMMARY OF THE INVENTION

Problems that the Invention is to Solve

According to the resin cage 101 described above, the tapered rollers are attached into the respective pockets from the radial direction of the cage while elastically deforming the bar portions 102. Therefore, a circumferential gap between the bar portion 102 and the tapered roller 105 cannot be narrowed. Thus, a volume reduction of space inside the bearing is limited. Accordingly, there has been a room for improvement in reducing the amount of lubricating oil staying in the bearing to lower the agitation resistance and to hold the tapered rollers 105 further stably. Further, because the bar portions 102 are elastically deformed when attaching the tapered rollers 105, there has been a problem that production efficiency is low due to difficulty in assembling, and there has been a possibility that edge lines of the bar portions 102 may be damaged.

The present invention has been made in view of the problems described above, and it is an object thereof to provide a tapered roller bearing resin cage and a tapered roller bearing in which a volume of space in the tapered roller bearing is reduced to suppress an agitation resistance of lubricating oil staying in the bearing and an attachment of tapered rollers is improved.

Means for Solving the Problems

The object of the present invention is achieved by following structures.

(1) A tapered roller bearing resin cage including a small diameter annular portion, a large diameter annular portion, and a plurality of bar portions arranged at intervals in a circumferential direction to connect the annular portions, pockets for holding tapered rollers being formed between the annular portions and adjacent ones of the bar portions, characterized in that each of the bar portions has a pair of circumferentially-directed side surfaces, each having a roller guide surface, and an inner-side inner peripheral surface, a circumferential width of which is smaller on a side of the large diameter annular portion than on a side of the small diameter annular portion, and in that each of the pockets has a roller retaining region in which a radially outer side pocket width and a radially inner side pocket width between the opposed circumferentially-directed side surfaces of the adjacent bar portions are smaller than a diameter of the roller.

(2) The tapered roller bearing resin cage according to (1), characterized in that the roller guide surface is configured as a flat surface.

(3) The tapered roller bearing resin cage according to (1) or (2), characterized in that each of the bar portions has a chamfered portion between the inner-side inner peripheral surface and an inner peripheral surface of the large diameter annular portion.

(4) The tapered roller bearing resin cage according to any one of (1) to (3), characterized in that each of the circumferentially-facing side surfaces has a curved surface disposed radially inward than the roller guide surface, and a circumferential gap between the roller and a boundary of the curved surface and the inner-side inner peripheral surface at an edge of the boundary on a large diameter side is equal to or larger than the gap at a remaining part of the boundary on a small diameter side.

(5) The tapered roller bearing resin cage according to any one of (1) to (4), characterized in that the large diameter annular portion is formed with recessed portions on an inner peripheral surface between the adjacent ones of the bar portions.

(6) The tapered roller bearing resin cage according to any one of (1) to (5), characterized in that the roller guide surface is arranged substantially at a position of a PCD of the tapered rollers.

(7) The tapered roller bearing resin cage according to any one of (1) to (6), characterized in that the roller guide surface is arranged in a range of ±5° or smaller with respect to a center of the pocket.

(8) The tapered roller bearing resin cage according to any one of (1) to (7), characterized in that each of the bar portion has an overhang protrusion on an outer peripheral portion at a corner on the side of the large diameter annular portion.

(9) The tapered roller bearing resin cage according to any one of (1) to (8), characterized in that the large diameter annular portion has hollowed portions on an inner peripheral surface between the adjacent ones of the bar portions.

(10) A tapered roller bearing including:
an outer ring having an outer ring raceway surface on an inner peripheral surface;
an inner ring having an inner ring raceway surface on an outer peripheral surface, and a small flange and a large flange on both sides of the inner ring raceway surface in an axial direction;
a plurality of tapered rollers rollably arranged between the outer ring raceway surface and the inner ring raceway surface; and
the cage according to any one of (1) to (9) that holds the plurality of tapered rollers at intervals in the circumferential direction.

(11) The tapered roller bearing according to (10), characterized in that each of the bar portions has a projection, which comes into contact with the small flange of the inner ring, on the inner-side inner peripheral surface on the side of the small diameter annular portion, and in that a gap between the projection and the small flange of the inner ring is smaller than a gap between a head of the tapered roller and an inner side surface of the large diameter annular portion of the cage.

(12) A tapered roller bearing resin cage including a small diameter annular portion, a large diameter annular portion, and a plurality of bar portions arranged at intervals in an circumferential direction to connect the annular portions, pockets for holding tapered rollers being formed between the annular portions and adjacent ones of the bar portions, characterized in that each of the bar portions has a pair of circumferentially-directed side surfaces, each having a roller guide surface, and an inner-side inner peripheral surface having at least a portion located radially inward than a line connecting axially inner side edges of a small flange and a large flange of an inner ring of the bearing when the cage is arranged therein, and in that each of the pockets has a roller retaining region in which a radially outer side pocket width and a radially inner side pocket width between the opposed circumferentially-directed side surfaces of the adjacent bar portions are smaller than a diameter of the roller.

(13) The tapered roller bearing resin cage according to (12), characterized in that a circumferential width of the inner-side inner peripheral surface is smaller on a side of the large diameter annular portion than on a side of the small diameter annular portion.

Advantages of the Invention

According to the tapered roller bearing resin cage and the tapered roller bearing of the present invention, the bar portion has the pair of circumferentially-directed side surfaces and the inner-side inner peripheral surface whose circumferential width is smaller on the side of the large diameter annular portion than on the side the small diameter annular portion, and in the roller retaining region, the radially outer side pocket width and the radially inner side pocket width are smaller than the diameter of the roller. Therefore, the tapered rollers can be attached to the cage from the axial direction, which improves the assembling. Further, the tapered roller can be attached to the cage while making the circumferential gap between the bar portion and the tapered roller so small that the tapered roller is hardly attached from the radial direction. Therefore, the tapered rollers can be stably held in an embraced manner, and the agitation resistance of the lubricating oil can be lowered to reduce the rotation torque.

Further, according to the tapered roller bearing resin cage and the tapered roller bearing of the present invention, the bar portion includes the pair of circumferentially-directed side surfaces and the inner-side inner peripheral surface having at least a portion located radially inward from the line connecting the axially inner side edges of the small flange and the large flange of the inner ring of the bearing when the cage is attached therein, and in the roller retaining region, the radially outer side pocket width and the radially inner side pocket width are made to be smaller than the diameter of the roller. Therefore, similarly to the above, the volume of space in the tapered roller bearing can be reduced to suppress the agitation resistance of the lubricating oil staying in the bearing and the attachment of the tapered roller can be improved.

EMBODIMENTS OF THE INVENTION

Hereinafter, tapered roller bearing resin cages and tapered roller bearings according to exemplary embodiments of the present invention will be described in detail with reference to the drawings.

Figure 1:
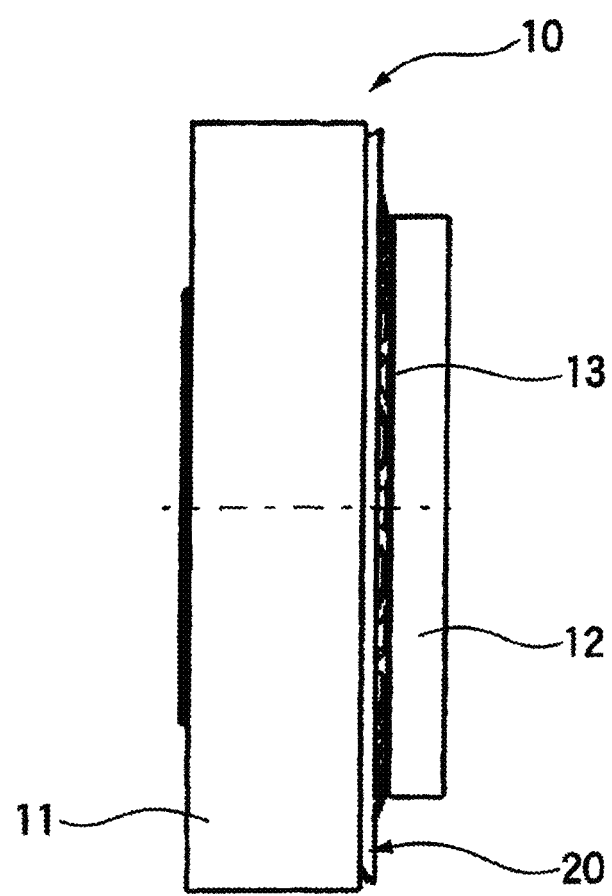
FIG. 1 is a side view of a tapered roller bearing according to a first exemplary embodiment of the present invention.
Figure 2:
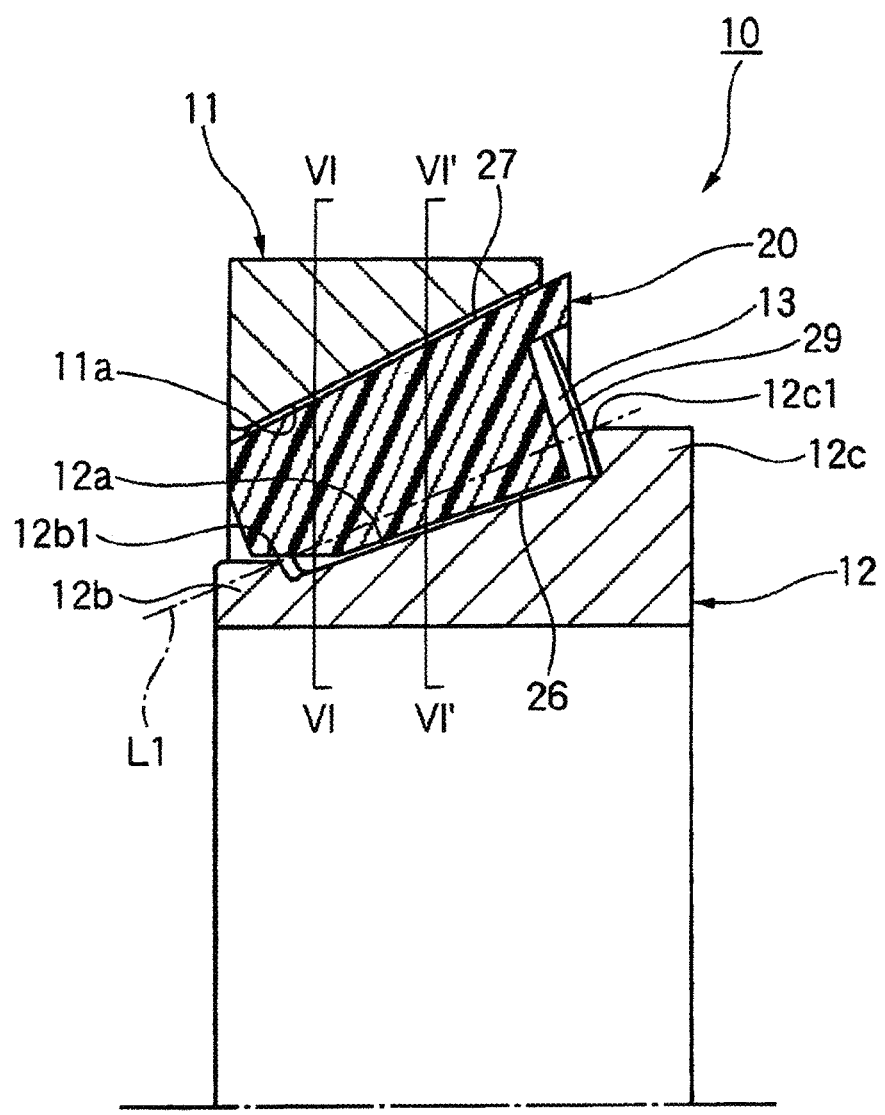
FIG. 2 is an enlarged longitudinally sectional view of the tapered roller bearing shown in FIG. 1.

(First Exemplary Embodiment) Firstly, with reference to FIGS. 1 to 7, the tapered roller bearing of a first exemplary embodiment of the present invention will be described below in detail. As shown in FIGS. 1 and 2, the tapered roller bearing 10 of the first exemplary embodiment includes an outer ring 11 having an outer ring raceway surface 11a on an inner peripheral surface and an inner ring 12 having an inner ring raceway surface 12a on an outer peripheral surface and a small flange 12b and a large flange 12c at both sides in the axial direction of the inner ring raceway surface 12a, a plurality of tapered rollers 13 arranged between the outer ring raceway surface 11a and the inner ring raceway surface 12a so as to freely roll and a cage 20 made of a resin for holding the plurality of tapered rollers 13 at intervals in the circumferential direction.

Figure 3:
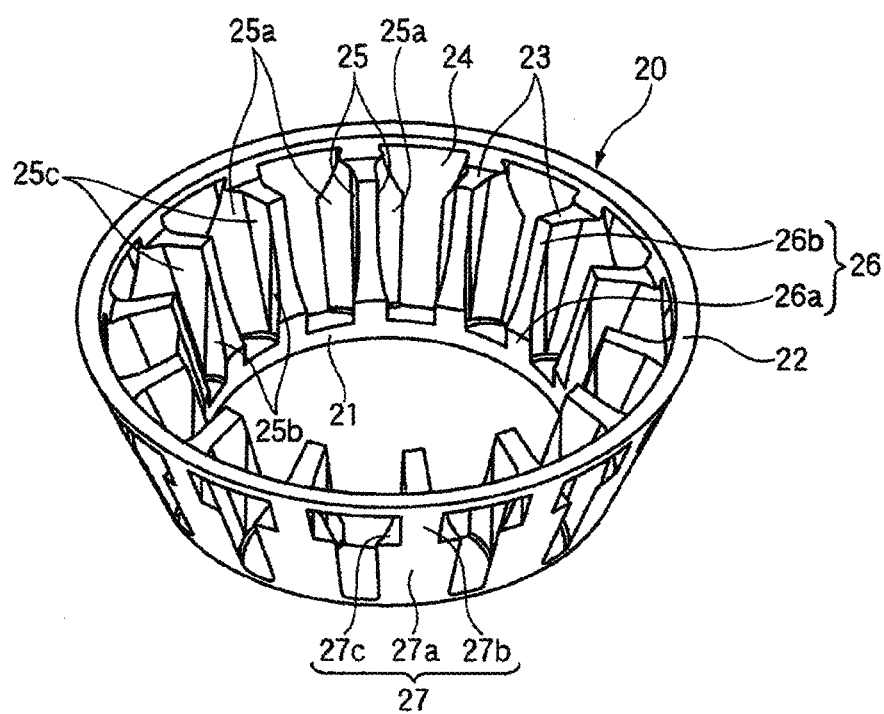
FIG. 3 is a perspective view of a tapered roller bearing resin cage.
Figure 5A:
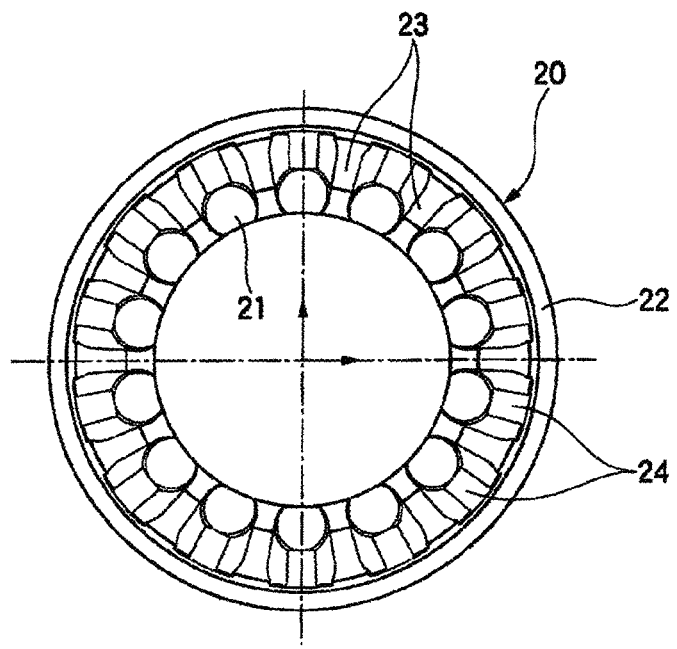
FIG. 5(a) is a front view with the cage shown in FIG. 3 seen from a large diameter annular portion side.
Figure 5B:
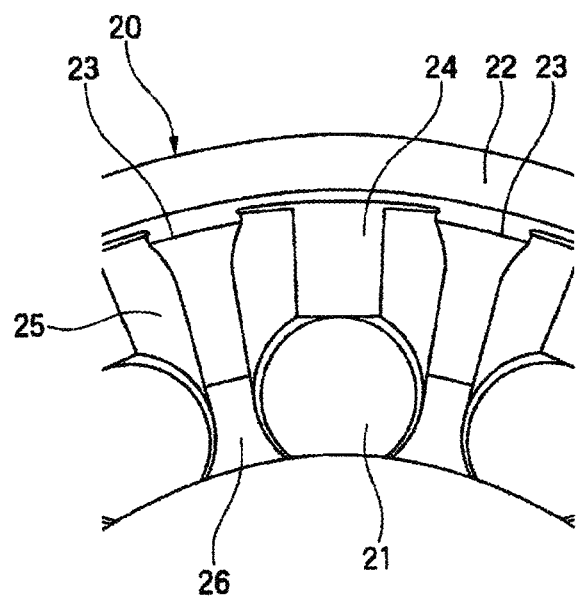
FIG. 5(b) is an enlarged view of main parts.

As shown in FIGS. 3 and 5(a) and 5(b), the cage 20 includes a small diameter annular portion 21 having a prescribed radial width so as to be opposed and come close to the inner peripheral surface of the outer ring 11 and the outer peripheral surface of the small flange 12b of the inner ring 12, a large diameter annular portion 22 whose inner peripheral surface has a diameter larger than that of the outer peripheral surface of the small diameter annular portion 21 and a plurality of bar portions 23 arranged at intervals in the circumferential direction and extending and inclined in the axial direction to connect the small diameter annular portion 21 and the large diameter annular portion 22 in the axial direction. The cage 20 has a plurality of pockets 24 defined by the small diameter annular portion 21, the large diameter annular portion 22 and the adjacent bar portions 23 and the tapered rollers 13 are held in the pockets 24 respectively so as to freely rotate.

As a resin material, synthetic resins are exemplified, such as a polyamide resin such as polyamide 46, polyamide 66 or the like, polybutylene telephthalate, polyphenylene sulfide (PPS), polyamide imide (PAI), thermoplastic polyimide, polyether ether ketone (PEEK) polether nitrile (PEN), etc. and the cage 20 is formed by an injection molding. When 10 to 50 wt % of fibrous filler (for example, glass fiber or carbon fiber) is suitably added to the above-described synthetic resin, the rigidity and dimensional accuracy of the cage can be improved.

The bar portion 23 includes a pair of circumferentially-directed side surfaces 25 respectively having roller guide surfaces, an inner-side inner peripheral surface 26 having a circumferential width smaller in the side of the large diameter annular portion 22 than that in the side of the small diameter annular portion 22 and an outer peripheral surface 27 extending substantially in parallel with the outer ring raceway surface 11a between the outer peripheral surfaces of the small diameter annular portion 21 and the large diameter annular portion 22.

Figure 4:
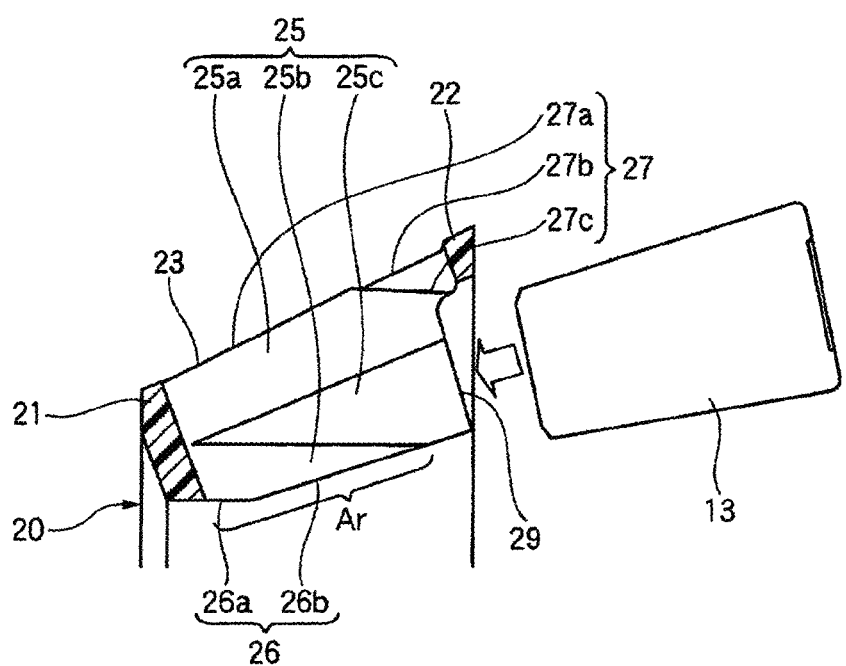
FIG. 4 is a side view showing a state that a tapered roller is attached to the cage shown in FIG. 3.
Figure 6A:
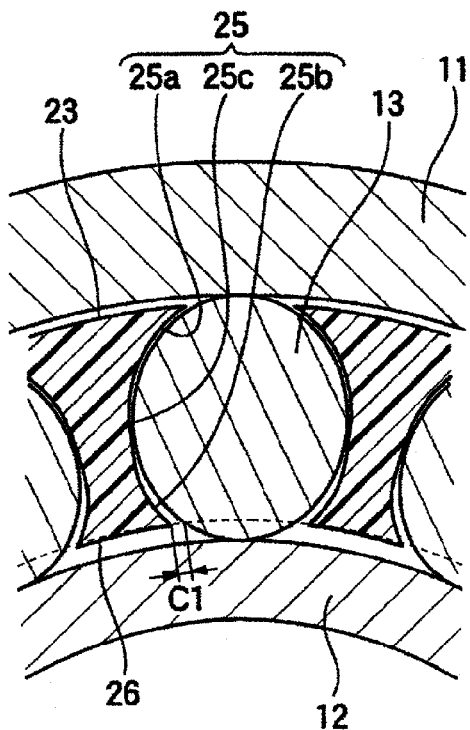
FIG. 6(a) is a sectional view taken along a line VI-VI in FIG. 2.
Figure 6B:
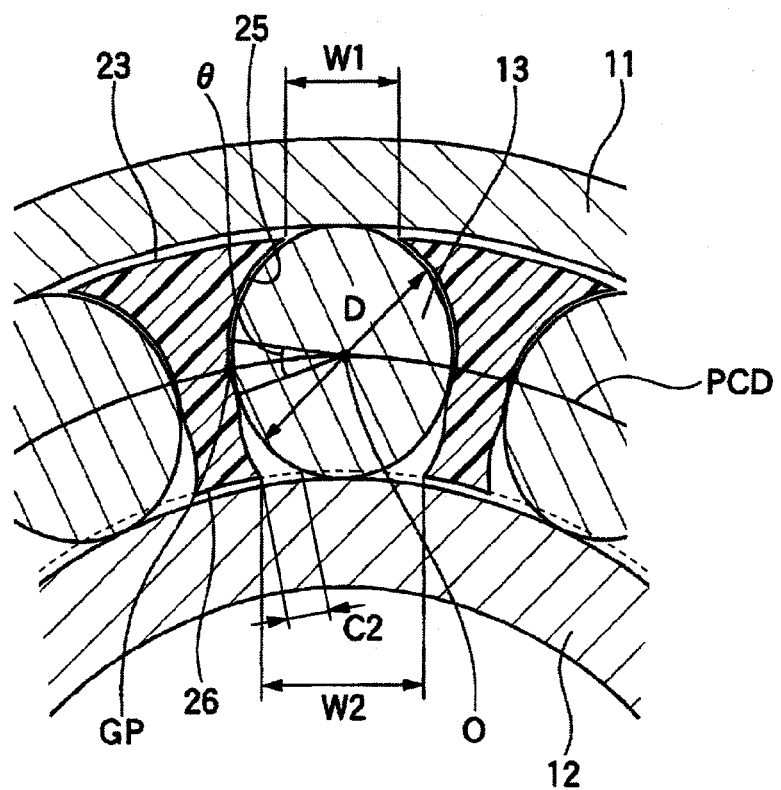
FIG. 6(b) is a sectional view taken along a line VI'-VI'.

The circumferentially-facing side surface 25 includes, as shown in FIGS. 4 and 6(a) and 6(b), circular arc shaped sections 25a, 25b and a flat surface section 25c forming the roller guide surface. A boundary between the circular arc shaped section 25a and the flat surface section 25c linearly extends radially outward as it goes to the side of the large diameter annular portion 22 and a boundary of the circular arc shaped section 25b and the flat surface section 25c linearly extends substantially along an axial direction. Accordingly, each flat surface section 25c substantially has a triangular form in which a radial distance is gradually increased toward the side of the large diameter annular portion 22 from the side of the small diameter annular portion 22 and reaches an end face 29 of the bar portion 23 in the side of the large diameter annular portion 22 and a section 26b of the inner-side inner peripheral surface 26 substantially parallel to the inside raceway surface 12a (in second to fourth exemplary embodiments which will be described later, flat surface sections 25c respectively reach chamfered portions 35). Further, a distance between the flat surface sections 25c of the opposed circumferentially-directed side surfaces 25 is substantially equal to a diameter of the tapered roller 13 in positions respectively in the axial direction.

As shown in FIG. 2, when the cage 20 is attached, the inner-side inner peripheral surface 26 has at least a part located radially inward from a line L1 connecting axially inner side edges 12b1, 12c1 of the small flange 12b and the large flange 12c of the inner ring 12. Further, as shown in FIG. 4, the inner-side inner peripheral surface 26 includes a section 26a having a uniform circumferential width which is continuous from the inner peripheral surface of the small diameter annular portion 21 and another section 26b which extends substantially in parallel with the inner ring raceway surface 12a to the side of the large diameter annular portion 22 from the section 26a with a circumferential width gradually narrowed to the side of the large diameter annular portion 22 and further extends to an end part of the side of the large diameter annular portion 22 with a substantially uniform circumferential width. Further, as shown in FIGS. 3 and 4, the outer peripheral surface 27 includes a section 27a whose circumferential width is gradually increased to the side of the large diameter annular portion 22 from the small diameter annular portion 21, a section 27b whose circumferential width is substantially uniform between the section 27a and the large diameter annular portion 22 and flat sections 27c extending in the axial direction in triangular forms in side view at both sides in the circumferential direction of the section 27b.

As shown in FIG. 6(b), the pocket 24 constructed in such a way forms a roller retaining region Ar where a radially outer side pocket width W1 and a radially inner side pocket width W2 are smaller than a diameter D of the roller between the opposed circumferentially-directed side surfaces 25 of the adjacent bar portions 23 in the boundary of the circular arc shaped section 25b of the circumferentially-facing side surface 25 and the inner-side inner peripheral surface 26.

Further, since the inner-side inner peripheral surface 26 has the circumferential width smaller in the side of the large diameter annular portion 22 than that in the side of the small diameter annular portion 22, as shown in FIGS. 6(a) and 6(b), when the tapered roller 13 is attached to the pocket 24, in a circumferential gap between the bar portion 23 and the tapered roller 13, a gap C2 on the large diameter side is equal to or larger than a gap C1 on the small diameter side (C1≤C2).

Accordingly, when the tapered roller 13 is attached to the pocket 24, the tapered roller 13 is guided between the flat surface sections 25c, attached in the axial direction from the side of the large diameter annular portion 22, abuts on the bar portion 23, and then, is guided by the circular arc shaped section 25a with a head 13a of the tapered roller 13 inclined gradually radially outward and accommodated in a proper position of the pocket 24.

Accordingly, even when the radially outer side pocket width W1 and the radially inner side pocket width W2 are made to be smaller than the diameter D of the roller to the extent that, in the conventional tapered roller bearing in which a bar portion 23 is elastically deformed and then a tapered roller 13 is radially attached to a pocket, the tapered roller 13 cannot be attached to the pocket to provide a large roller retaining region Ar, in the present exemplary embodiment, the bar portion 23 is not elastically deformed and the tapered roller 13 can be attached to the pocket from the axial direction. Further, since in the circumferential gap between the bar portion 23 and the tapered roller 13, the gap C2 on the large diameter side is equal to or larger than the gap C1 on the small diameter side, when the tapered roller 13 is attached to the pocket from the axial direction, the tapered roller 13 can be shifted and inserted toward the radially inner side. Thus, the tapered roller 13 can be prevented from interfering with the large diameter side annular portion 22.

The cage 20 is formed with a large thickness in a bearing space formed by the outer ring 11 and the inner ring 12. Further, since the pocket 24 substantially includes, in the roller retaining region Ar, a space in which the tapered roller 13 is arranged and a space in which the tapered roller 13 is permitted to be inclined during the attachment of the tapered roller 13, an amount of lubricating oil in the bearing space can be reduced.

Further, in the present exemplary embodiment, in the circumferential gap between the bar portion 23 and the tapered roller 13, the gap C2 on the large diameter side is equal to or larger than the gap C1 on the small diameter side. The boundary between the circular arc shaped section 25a and the flat surface section 25c linearly extends radially outward as it goes to the side of the large diameter annular portion 22 and the boundary of the circular arc shaped section 25b and the flat surface section 25c linearly extends substantially along the axial direction. Further, the outer peripheral surface 27 includes the flat sections 27c extending in the axial direction in the triangular forms in side view at both the sides in the circumferential direction of the section 27b near the large diameter annular portion 22. Thus, a die of the cage 20 has a simple die structure including two dies having a fixed die not shown in the drawing and a moving die moving in the axial direction of the cage 20 relative to the fixed die so that a pattern may be drawn in the axial direction during an injection molding. When the tapered roller 13 is inserted into the above-described cage 20, if the tapered roller 13 is inserted from a space in which the die forming the pocket 24 of these dies is drawn in the axial direction the tapered roller can be inserted into the cage without elastically deforming the cage 20.

Figure 7:
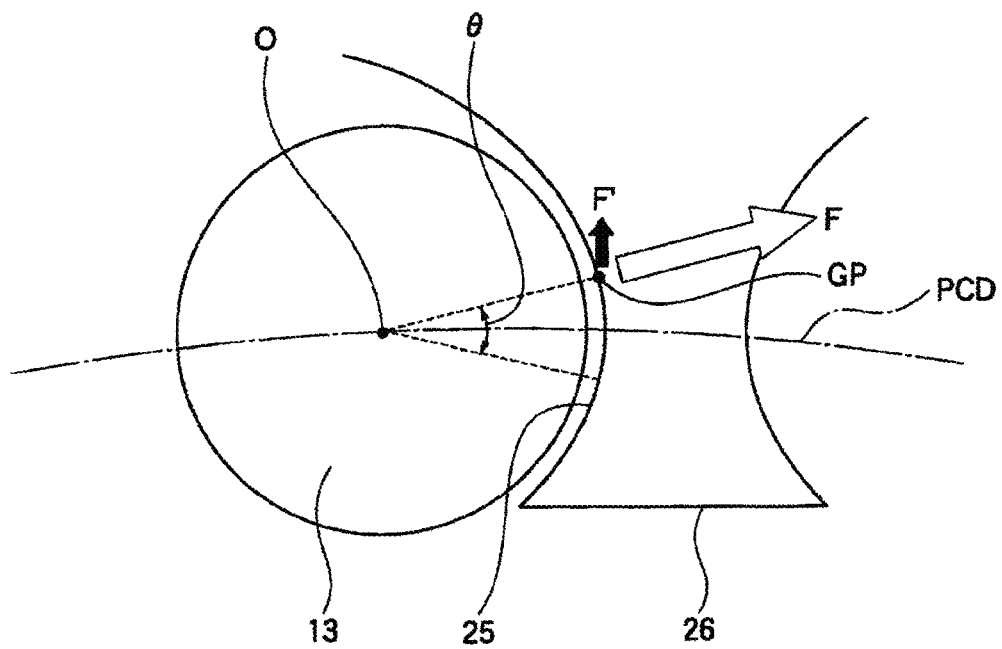
FIG. 7 is a schematic view showing a relation between a guide position of the tapered roller by a roller guide surface and a component of force acting on the cage.
Figure 8:
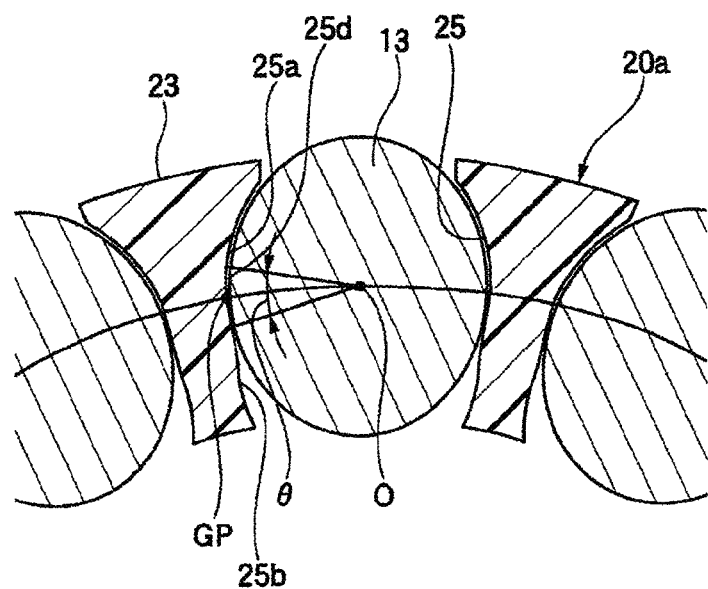
FIG. 8 is a sectional view showing a roller guide surface formed with a circular arc shape according to a first modified example of the first exemplary embodiment.

As shown in FIG. 8, a guide position GP in the roller guide surface of the circumferentially-facing side surface 25 is set to a range of an angle θ of ±5° or smaller with respect to a substantial PCD position of the tapered roller 13, for example, a center O of the pocket 24. Thus, the skew of the tapered roller 13 can be corrected by a smaller load and a torque loss caused by the skew can be reduced. Further, as shown in FIG. 7, a radial component of force F' of a force F acting on the cage 20 is suppressed to decrease the wobbling rotation of the cage 20, so that the variation of a bearing torque can be suppressed. In the present exemplary embodiment, the roller guide surface set as described above is formed with the flat surface section 25c, however, for example, as in a cage 20a of the first modified example shown in FIG. 8, the roller guide surface may be formed with other circular shaped part 25d whose curvature is different from those of the circular arc shaped sections 25a, 25b.

Accordingly, in the resin cage 20 of the present exemplary embodiment, the bar portion 23 includes a pair of circumferentially-directed side surfaces 25 and the inner-side inner peripheral surface 26 having the circumferential width smaller in the large diameter annular portion side than in the small diameter annular portion side, and the radially outer side pocket width W1 and the radially inner side pocket width W2 are made to be smaller than the diameter D of the roller. Thus, during the injection molding of the cage 20, the die can be detached in the axial direction of the cage. Further, the tapered roller 13 can be attached from the axial direction under a state that the circumferential gap between the bar portion 23 and the tapered roller 13 is so small that the conventional tapered roller bearing is hardly assembled, the tapered roller 13 can be stably held and the agitation resistance of the amount of lubricating oil can be lowered to reduce a rotation torque.

Further, when the cage 20 is attached, since the inner-side inner peripheral surface 26 has at least a part located radially inward from the line L1 formed by connecting the axially inner side edges 12b1, 12c1 of the small flange 12b and the large flange 12c of the inner ring 12, a volume of space of the tapered roller bearing can be decreased and the agitation resistance of the lubricating oil staying in the bearing can be reduced.

Further, the circumferentially-facing side surface 25 has the curved surface part 25b radially inward the roller guide surface, and, as the circumferential gap between the bar portion 23 and the tapered roller 13, the circumferential gap C2 on the large diameter side is equal to or larger than the circumferential gap C1 on the small diameter side. Thus, even when the circumferential gap between the bar portion 23 and the tapered roller 13 in the small diameter side is formed to be so small that the tapered roller 13 is hardly radially attached, the tapered roller 13 can be attached from the axial direction by shifting the tapered roller 13 to a radially inner side. Thus, the tapered roller 13 can be prevented from interfering with the large diameter annular portion 22 of the cage 20 during the assembling and can be smoothly assembled.

Further, since the roller guide surface is set to the range of the angle θ of ±5° or smaller with respect to the substantial PCD position of the tapered roller 13, for example, the center O of the pocket 24, the skew of the tapered roller 13 can be corrected by a small force, the torque loss can be reduced, and the occurrence of the radial component of force of the cage 20 is suppressed to decrease the wobbling rotation of the cage, so that the variation of the bearing torque can be suppressed.

Figure 9A:
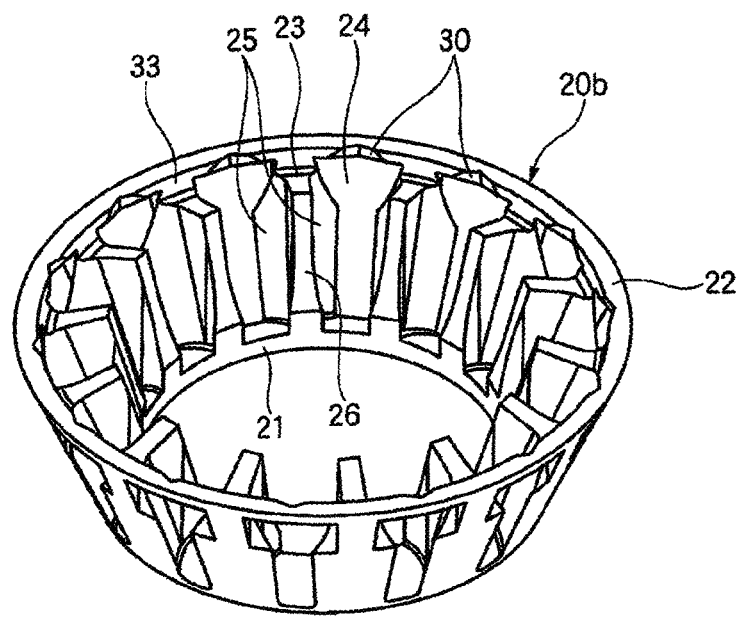
FIG. 9(a) is an entire perspective view of a cage of a second modified example of the first exemplary embodiment.
Figure 9B:
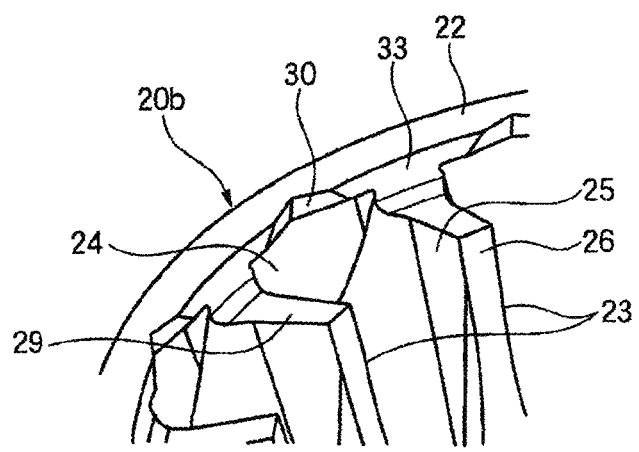
FIG. 9(b) is an enlarged perspective view of a large diameter annular portion.

FIGS. 9(a) and 9(b) show a resin cage 20b for a tapered roller bearing according to a second modified example of the first exemplary embodiment. In this resin cage 20b, in an inner peripheral surface 33 of a large diameter annular portion 22 between adjacent bar portions 23, a substantially triangular shaped recessed portion 30 formed with two flat surfaces is provided. By the recessed portion 30 formed in the inner peripheral surface 33 of the large diameter annular portion 22, the interference of a tapered roller 13 with the large diameter annular portion 22 of the cage 20b can be more assuredly prevented during an attachment of the tapered roller and an amount of shift of the tapered roller 13 to an inner peripheral side can be decreased during the attachment of the tapered roller 13 to smoothly attach the tapered roller.

Figure 10:
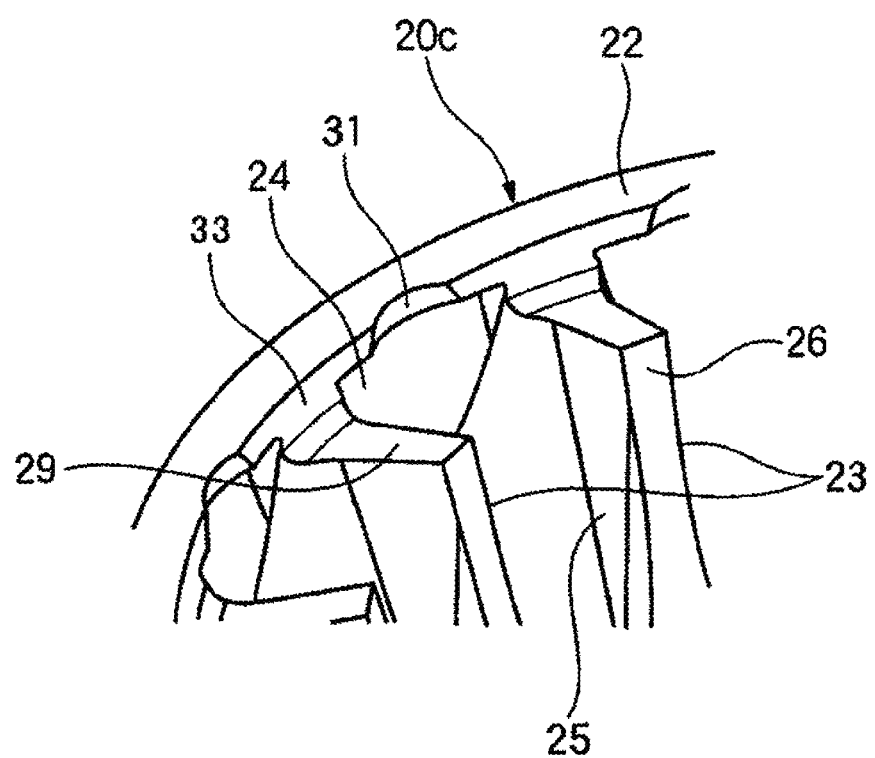
FIG. 10 is an enlarged perspective view of a third modified example of the first exemplary embodiment.

The form of the recessed portion 30 is not limited to the triangular form formed with the two flat surfaces and any form may be used in which the interference of the tapered roller 13 with the large diameter annular portion 22 can be decreased during the attachment of the tapered roller. For example, as in a resin cage 20c of a third modified example shown in FIG. 10, a circular arc shaped recessed portion 31 may be formed in an inner peripheral surface 33 in a large diameter part 22 between adjacent bar portions 23.

Figure 11A:
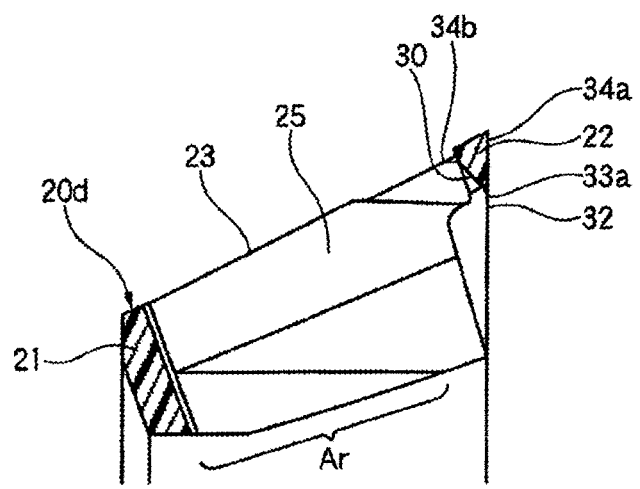
FIG. 11(a) and FIG. 11(b) are longitudinally sectional views of cages of fourth and fifth modified examples of the first exemplary embodiment.
Figure 11B:
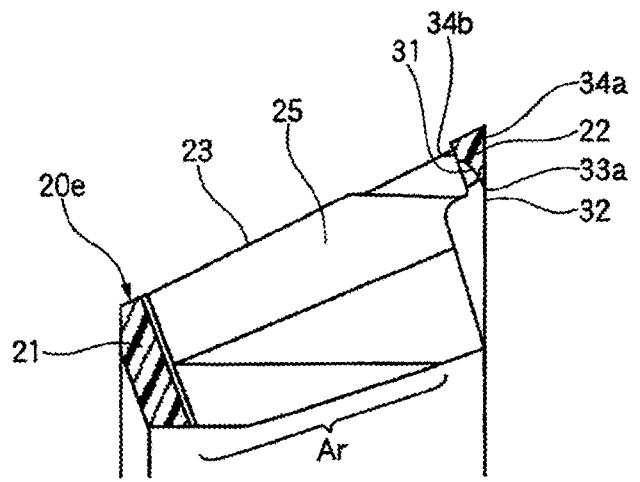

Further, FIGS. 11(a) and 11(b) show resin cages 20d, 20e according to fourth and fifth modified examples of the first exemplary embodiment. As shown in the cages 20d, 20e, a triangular shaped recessed portion 30 or a circular arc shaped recessed portion 31 is not formed up to an axial outer side surface 34a of a large diameter annular portion 22 and may be formed between an axial inner side surface 34b and an inner peripheral surface 33 with a small flat surface section 33a left in the inner peripheral surface 33. In the second to fifth modified examples, since there is a fear that the strength of the bar portion 23 may be possibly lowered, the bar portion is preferably formed by using a reinforcing member such as a core metal.

(Second Exemplary Embodiment) Now, a tapered roller bearing according to a second exemplary embodiment of the present invention will be described below with reference to FIG. 12(a) to FIG. 13. Portions equivalent to or the same as those of the first exemplary embodiment are designated by the same reference numerals or corresponding reference numerals to simplify or omit an explanation.

Figure 12A:
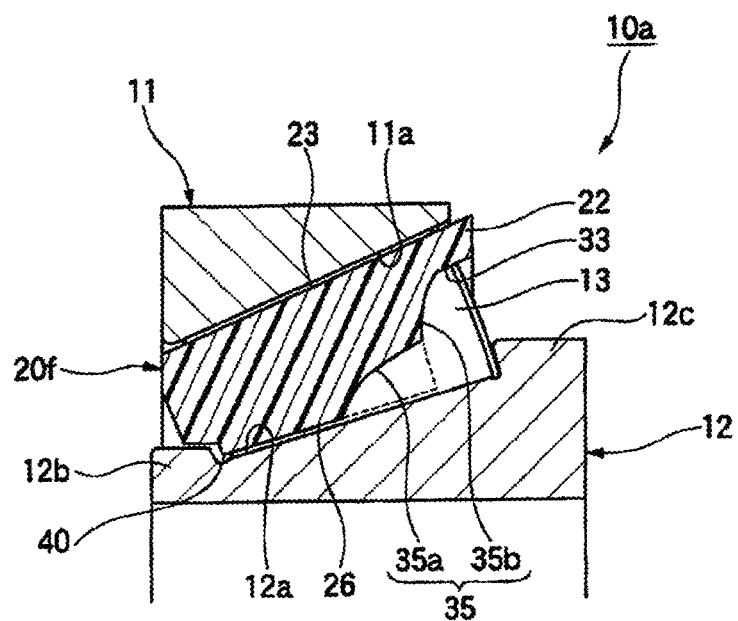
FIG. 12(a) is a longitudinally sectional view of a tapered roller bearing of a second exemplary embodiment of the present invention.
Figure 12B:
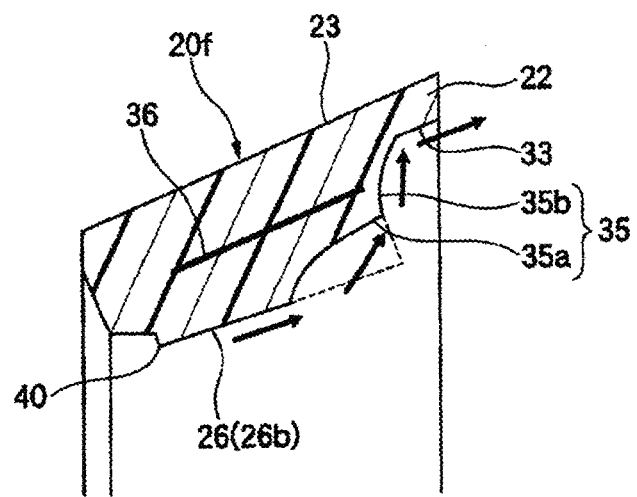
FIG. 12(b) is a longitudinally sectional view showing the flow of lubricating oil along a cage.
Figure 13:
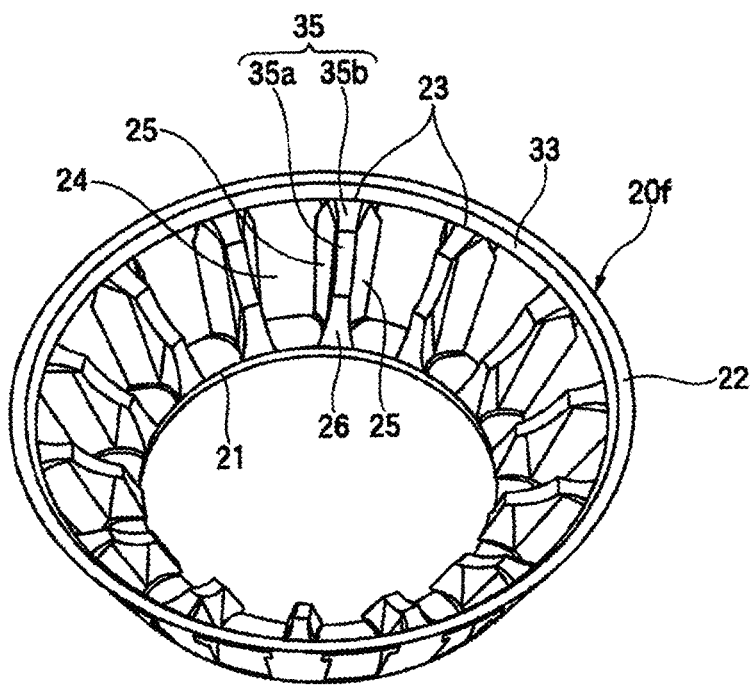
FIG. 13 is a perspective view of an external appearance of a resin cage for the tapered roller bearing shown in FIG. 12.

As shown in FIGS. 12(a) to 13, a resin cage 20f of the second exemplary embodiment has a chamfered portion 35 having two circular arcs between an inner-side inner peripheral surface 26 of a bar portion 23 and an inner peripheral surface 33 of a large diameter annular portion 22. The chamfered portion 35 includes the two circular arc parts of a first circular arc part 35a provided radially inward a support part 36 (a roller guide surface) for supporting a tapered roller 13 by the cage 20f and provided in a small diameter annular portion 21 side and a second circular arc part 35b provided in the side of the large diameter annular portion 22. A slope of the first circular arc part 35a is steeper than a slope of the inner-side inner peripheral surface 26 and a slope of the second circular arc part 35b is steeper than the slope of the first circular arc part 35a.

When lubricating oil supplied to a tapered roller bearing 10a having such a cage 20f flows toward the large diameter annular portion 22 along the inner-side inner peripheral surface 26 by a centrifugal force as shown by arrow marks in FIG. 12(b), since the lubricating oil is accelerated to be discharged by the first circular arc part 35a and the second circular arc part 35b inclined more than the inner-side inner peripheral surface 26. Thus, an amount of lubricating oil staying in the tapered roller bearing 10a is decreased, so that a torque loss due to an agitation resistance is suppressed. Further, the two circular arc sections 35a, 35b are formed so that the length of the support part 36 ensures ½ times or more as large as the length of the tapered roller 13, so that the tapered roller 13 is stably held. The inner-side inner peripheral surface 26 of the bar portion 23 of the present exemplary embodiment does not have a section 26a which is continuous from an inner peripheral surface of the small diameter annular portion 21 and has a section 26b which extends substantially in parallel with an inner ring raceway surface 12a. Accordingly, between the inner peripheral surface of the small diameter annular portion 21 and the inner-side inner peripheral surface 26 of the bar portion 23, a projection 40 is provided which protrudes radially inward. Thus, since the projection is opposed to a small flange 12b, an axial movement of the cage 20f is regulated. Since other structures and operations are the same as those of the cage 20 of the first exemplary embodiment, an explanation thereof will be omitted.

Figure 14:
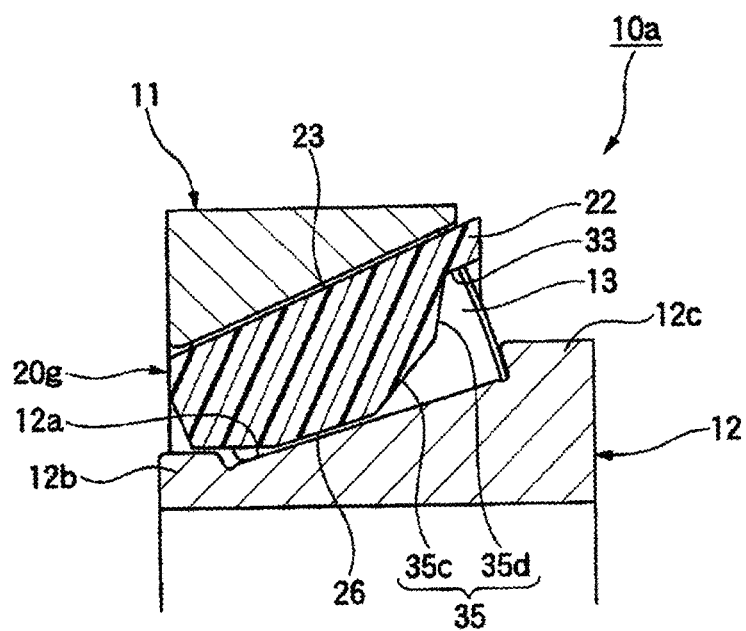
FIG. 14 is a longitudinally sectional view of a tapered roller bearing of a first modified example of the second exemplary embodiment.

FIG. 14 shows a resin cage 20g according to a first modified example of the present exemplary embodiment. This resin cage 20g has a chamfered portion 35 formed with two straight line parts 35c and 35d whose slopes are different from each other. In this case, the slope of the straight line part 35c provided in a small diameter annular portion 21 side is steeper than the slope of an inner-side inner peripheral surface 26 and the slope of the straight line part 35d provided in a large diameter annular portion 22 side is steeper than the slope of the straight line part 35c. Accordingly, a sufficient length of a support part 36 for supporting a tapered roller 13 is ensured (½ times or more as large as the length of the tapered roller 13), so that the tapered roller 13 is stably held. The chamfered portion 35 formed with the two circular arc sections 35a, 35b is more excellent in its discharge property of lubricating oil than that formed with the two straight lines 35c and 35d. On the other hand, the production of the chamfered portion formed with the two straight lines 35c and 35d is easier than the other.

In the above-described exemplary embodiment, the chamfered portion 35 is supposed to be formed with the two circular arc sections 35a, 35b or the two straight line parts 35c and 35d, the chamfered portion 35 is not limited thereto, and the circular arc part may be combined with the straight line part.

Figure 15A:
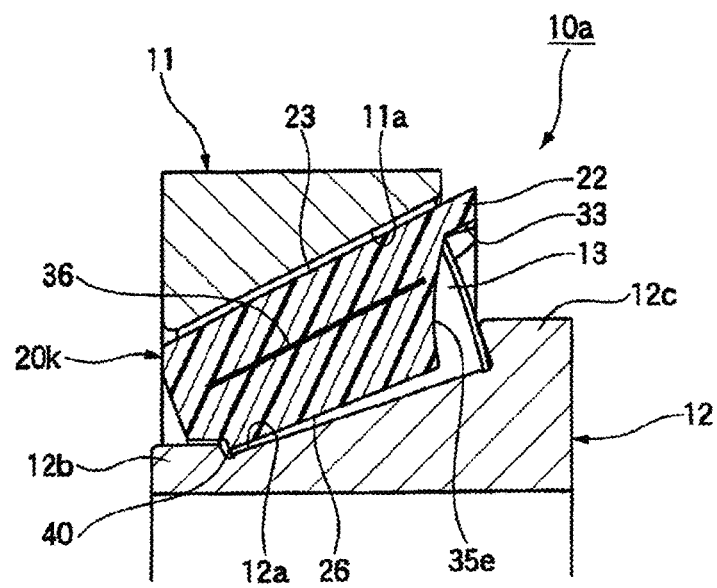
FIG. 15(a) is a longitudinally sectional view of a tapered roller bearing of a second modified example of the second exemplary embodiment.
Figure 15B:
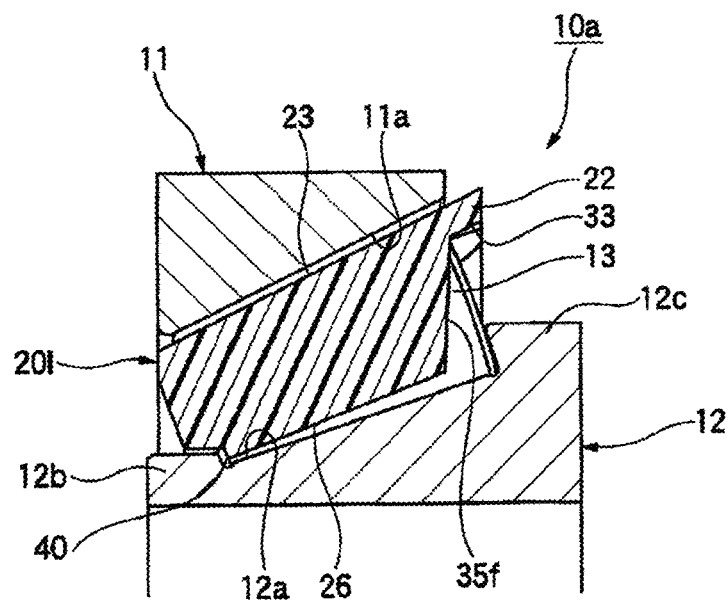
FIG. 15(b) is a longitudinally sectional view of a tapered roller bearing of a third modified example of the second exemplary embodiment.

Further, the chamfered portion 35 may be formed only with a single circular arc part or a single straight line part to easily manage a dimension during a production. Specifically, as shown in FIG. 15(a), in a resin cage 20k according to a second modified example of the present exemplary embodiment, between an inner-side inner peripheral surface 26 of a bar portion 23 and an inner peripheral surface 33 of a large diameter annular portion 22, a chamfered portion 35e formed only with the circular arc part is provided. Further, in a resin cage 20l according to a third modified example of the present exemplary embodiment shown in FIG. 15(b), between an inner-side inner peripheral surface 26 of a bar portion 23 and an inner peripheral surface 33 of a large diameter annular portion 22, a chamfered portion 35f formed only with the straight line part is provided.

Figure 16A:
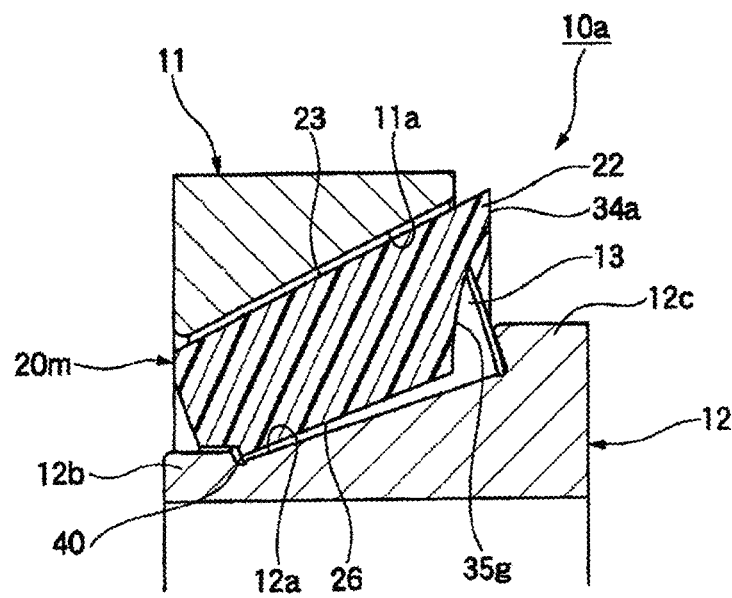
FIG. 16(a) is a longitudinally sectional view of a tapered roller bearing of a fourth modified example of the second exemplary embodiment.
Figure 16B:
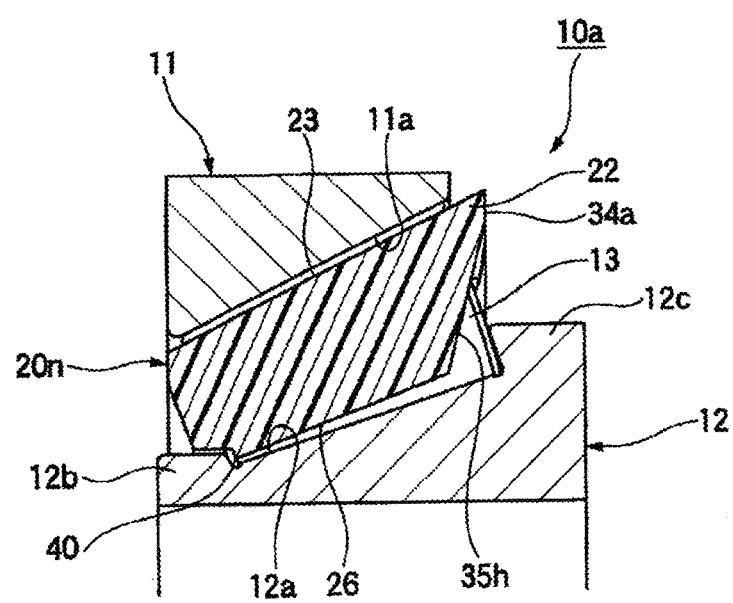
FIG. 16(b) is a longitudinally sectional view of a tapered roller bearing of a fifth modified example of the second exemplary embodiment.

Further, the single circular arc part or straight line part forming the chamfered portion 35 may form a part of the inner peripheral surface 33 of the large diameter annular portion 22 to more easily manage a dimension during a production. Specifically, in a resin cage 20m according to a fourth modified example of the present exemplary embodiment shown in FIG. 16(a), between an inner peripheral surface 26 of a bar portion 23 and an axial outer side surface 34a of a large diameter annular portion 22, a chamfered portion 35g formed with a single circular arc part which forms a part of the inner peripheral surface of the large diameter annular portion 22 is continuously provided. Further, in a resin cage 20n according to a fifth modified example of the present exemplary embodiment shown in FIG. 16(b), between an inner peripheral surface 26 of a bar portion 23 and an axial outer side surface 34a of a large diameter annular portion 22, a chamfered portion 35h formed with a single straight line part which forms a part of the inner peripheral surface of the large diameter annular portion 22 is continuously provided.

(Third Exemplary Embodiment) Now, a tapered roller bearing resin cage according to a third exemplary embodiment of the present invention will be described below with reference to FIG. 17 and FIG. 18. Portions equivalent to or the same as those of the above-described exemplary embodiments are designated by the same reference numerals or corresponding reference numerals to simplify or omit an explanation.

Figure 17:
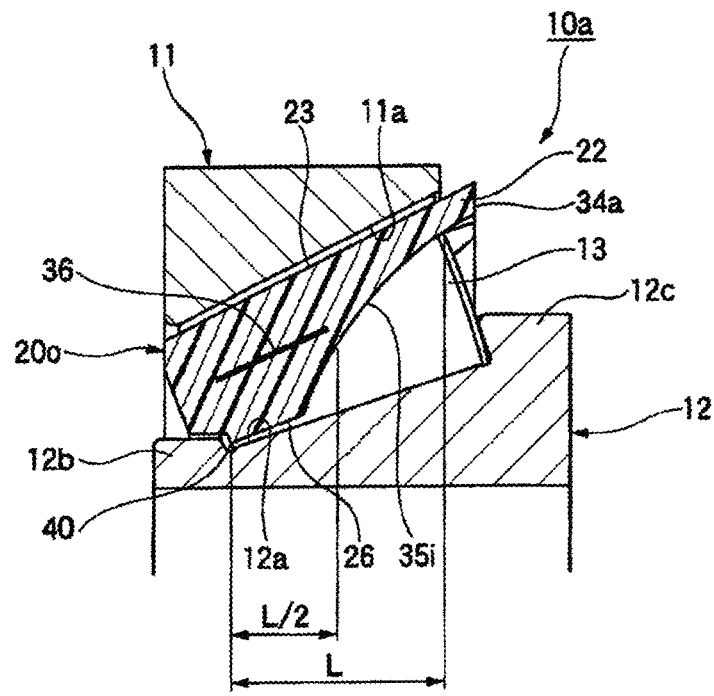
FIG. 17 is a longitudinally sectional view of a tapered roller bearing according to a third exemplary embodiment of the present invention.

As shown in FIG. 17, in a cage 20o made of a resin of the third exemplary embodiment, an inner-side inner peripheral surface 26 of a bar portion 23 is made to be shorter than ½ times as large as an axial length L of the bar portion 23, and between the inner-side inner peripheral surface 26 and an axial outer side surface 34a of a large diameter annular portion 22, a chamfered portion 35i is formed as a single circular arc part. Accordingly, a support part 36 for supporting a tapered roller 13 by the cage 20o is shorter than ½ times as large as an axial length of the tapered roller 13. In such a cage 20o, under a condition that a pre-load is not taken out (a no-load range is not present), a position of the tapered roller 13 is maintained by an outer ring 11 and an inner ring 12. Thus, the cage 20o is preferably applied to a case that the position of the cage 20o is hardly required to be maintained. Further, an amount of material may be advantageously more decreased than that of the above-described exemplary embodiments. Since other structures and operations are the same as those of the cages 20m, 20n of the second exemplary embodiment, an explanation thereof will be omitted.

Figure 18:
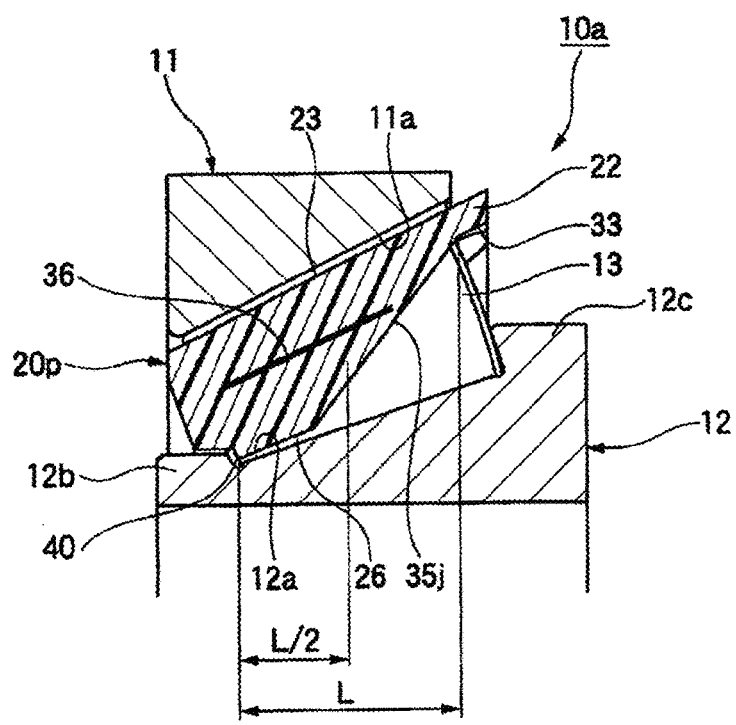
FIG. 18 is a longitudinally sectional view of a tapered roller bearing according to a modified example of the third exemplary embodiment.
Figure 19A:
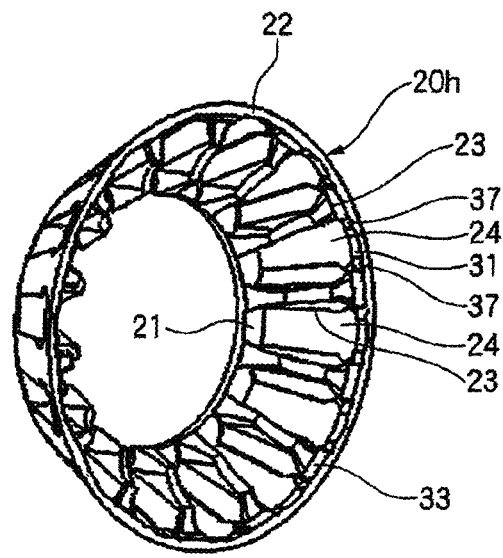
FIG. 19(a) is a perspective view of an external appearance of a tapered roller bearing resin cage according to a fourth exemplary embodiment of the present invention.
Figure 19B:
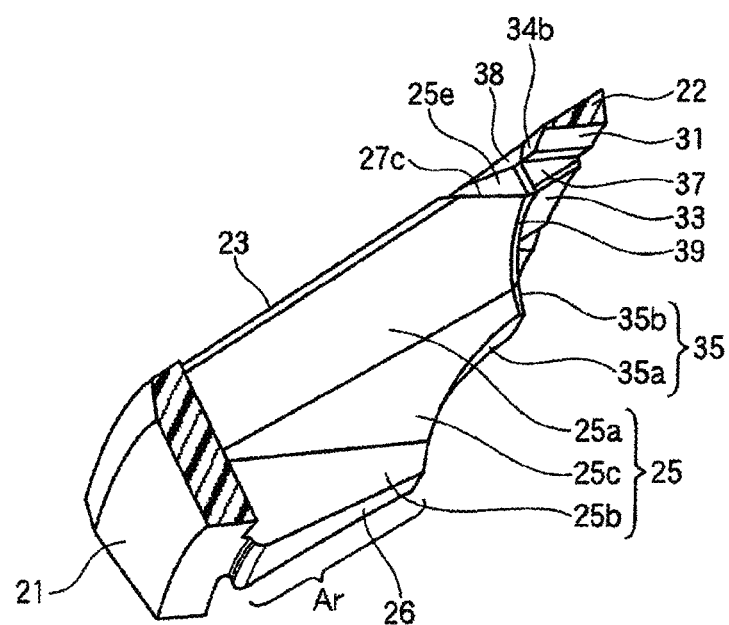
FIG. 19(b) is an enlarged perspective view of main parts shown by cutting a bar portion of the cage.

In a cage 20p made of a resin according to a modified example of the present exemplary embodiment shown in FIG. 18, a chamfered portion 35j may be formed with a single straight line part in place of the single circular arc part in FIG. 17. The straight line part is provided, so that a dimension during a production can be more easily managed. Further, a support part 36 for supporting a tapered roller 13 by the cage 20p can be made to be longer than that of the above-described cage 20o. In this case, the chamfered portion 35j is formed between an inner-side inner peripheral surface 26 and an inner peripheral surface 33 of a large diameter annular portion 22 similarly to the cages 20k, 20l of the second exemplary embodiment. The chamfered portions 35i, 35j of the present exemplary embodiment may be formed as a part of the inner peripheral surface 33 of the large diameter annular portion 22 or formed separately from the inner peripheral surface 33.

(Fourth Exemplary Embodiment) Now, a tapered roller bearing resin cage according to a fourth exemplary embodiment of the present invention will be described with reference to FIG. 19(a) to FIG. 21. Portions equivalent to or the same as those of the above-described exemplary embodiments are designated by the same reference numerals or corresponding reference numerals to simplify or omit an explanation.

As shown in FIG. 19(a) to FIG. 20(c), in a cage 20h of the fourth exemplary embodiment, in an inner peripheral surface 33 of a large diameter annular portion 22 for connecting adjacent bar portion 23 to each other, hollowed portions 37 formed with two flat surfaces and cut out substantially in a V shape in section at positions corresponding to flat sections 27c of an outer peripheral surface 27 at both sides in the circumferential direction of circular arc shaped recessed portions 31. Further, in an outer peripheral part of a corner part of the side of the large diameter annular portion 22, that is, a corner part of a circumferentially-facing side surface 25e between a section 27b near the large diameter annular portion 22 and the flat section 27c, and an axial inner side surface 34b of the large diameter annular portion 22, in a part covering a radially outer side of the flat section 27c of the outer peripheral surface 27, a substantially triangular shaped overhang protrusion 38 is formed. Further, in an edge line of a roller guide surface 25 of the bar portion 23 and a second circular arc part 35b of a chamfered portion 35, a chamfered tapered part 39 is provided.

In a tapered roller bearing 10c, since a large flange 12c of an inner ring 12 constantly comes into sliding contact with a head 13a of a tapered roller 13 as well as a rolling contact of outer and inner rings 11 and 12 with the tapered roller 13, when an amount of a supply of lubricating oil to the large flange 12c is insufficient, there is a fear that a heat-seizure may occur. The hollowed portion 37 and the overhang protrusion 38 function as an oil basin of the lubricating oil supplied to the large flange 12c.

Figure 20A:
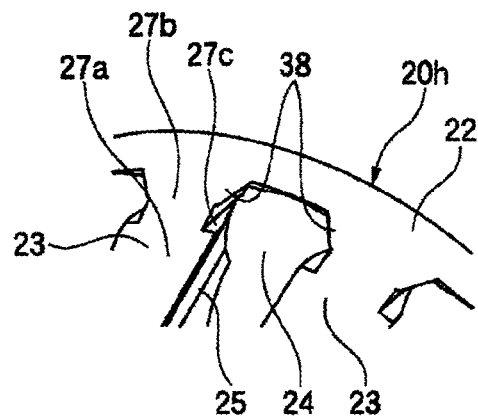
FIG. 20(a) is a perspective view of an outer peripheral surface of a large diameter annular portion of the cage shown in FIG. 19.
Figure 20B:
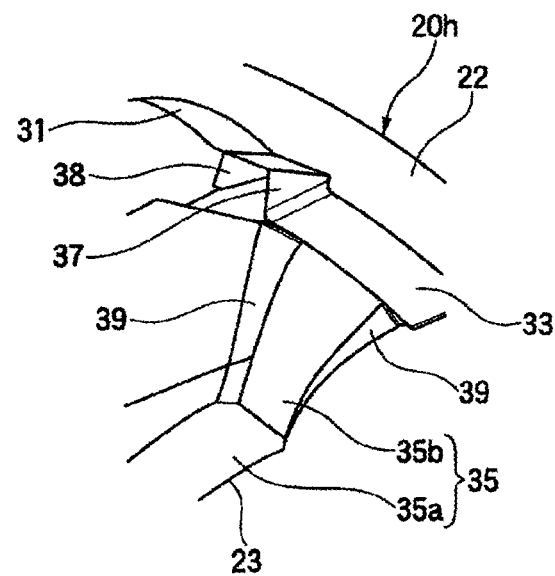
FIG. 20(b) is a perspective view of an inner peripheral surface of the large diameter annular portion.
Figure 20C:
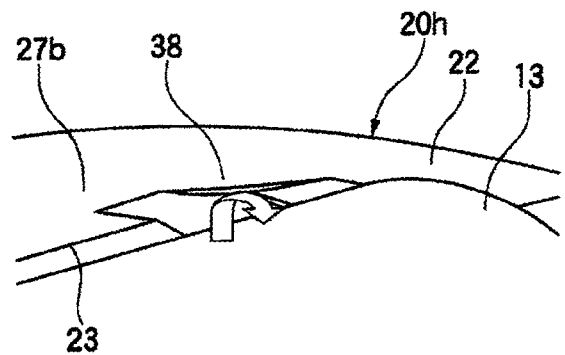
FIG. 20(c) is a perspective view of main parts showing the flow of lubricating oil of the large diameter annular portion.
Figure 21:
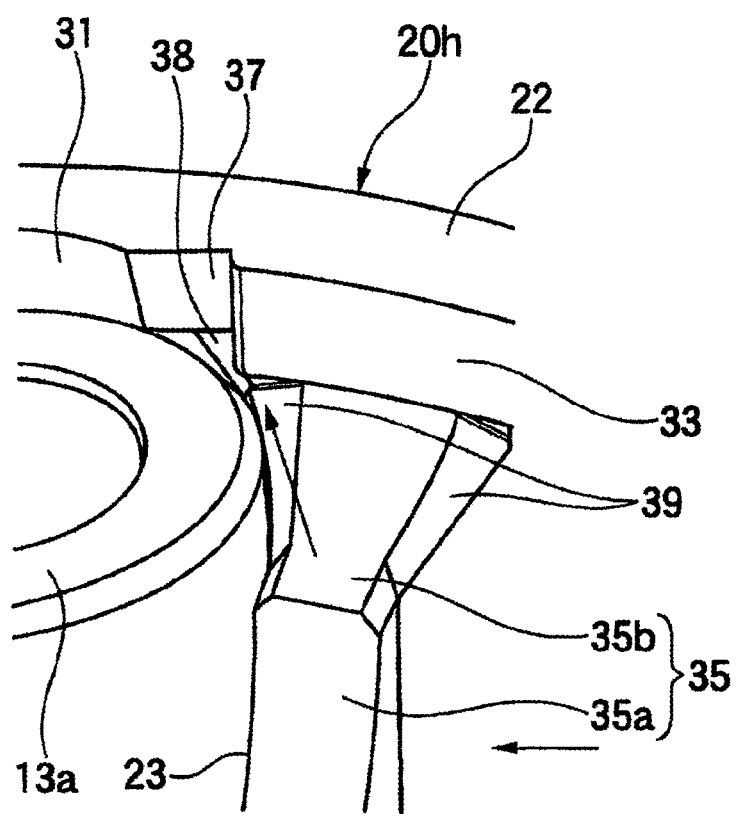
FIG. 21 is a perspective view of the main parts viewing the flow of the lubricating oil from the inner peripheral surface side of the large diameter annular portion.

The supply of the lubricating oil to the large flange 12c in the cage 20h of the resent exemplary embodiment will be described. As shown in FIG. 21 and FIG. 20(c), when the lubricating oil supplied from a small diameter annular portion 21 side flows along an inner-side inner peripheral surface 26 of the bar portion 23 and a first circular arc part 35a by a centrifugal force and reaches the second circular arc part 35b, as shown by an arrow mark in FIG. 21, the lubricating oil is supplied to the hollowed portion 37 from the tapered part 39 of the bar portion 23. At this time, since, in the outer peripheral part of the corner part of the side of the large diameter annular portion 22, the overhang protrusion 38 is provided, the lubricating oil supplied to the hollowed portion 37 does not pass through the cage 20h to be discharged to the outer ring 11 side. The lubricating oil is stored in the hollowed portion 37 and supplied to the head 13a of the tapered roller 13 to prevent the heat-seizure. Further, since the hollowed portion 37 is provided, the lubricating oil is temporarily stored and easily supplied to the head 13a of the tapered roller 13. Since other structures and operations are the same as those of the cage 20 of the first exemplary embodiment, an explanation thereof will be omitted.

Figure 22A:
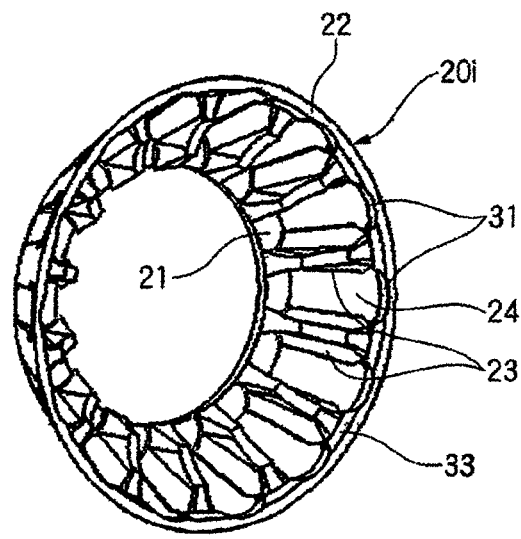
FIG. 22(a) is a perspective view of an external appearance of a modified example of the cage shown in FIG. 19.
Figure 22B:
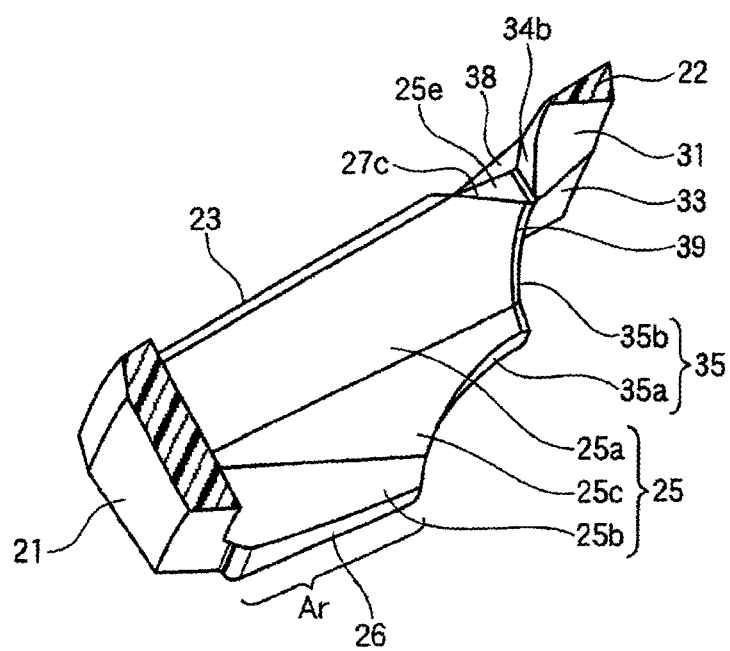
FIG. 22(b) is an enlarged perspective view of main parts shown by cutting a bar portion of the cage.

FIGS. 22(a) and 22(b) show a resin cage 20i according to a modified example of the fourth exemplary embodiment. The resin cage 20i is merely different from the one described in FIGS. 20(a) to 20(c) in view of a point that the hollowed portion 37 is not provided. In this modified example, lubricating oil that is supplied from a small diameter annular portion 21 side and enters a corner part of a pocket 24 in a large diameter annular portion 22 side from a tapered part 39 of a bar portion 23 is prevented from being discharged by an overhang protrusion 38 and is supplied to a head 13a of a tapered roller 13 for lubrication. Thus, a contact part of a large flange 12c of an inner ring 12 with the head 13a of the tapered roller 13 is lubricated to prevent a heat-seizure.

(Fifth Exemplary Embodiment) Now, a tapered roller bearing according to a fifth exemplary embodiment of the present invention will be described with reference to FIG. 23 and FIG. 24. Portions equivalent to or the same as those of the above-described exemplary embodiments are designated by the same reference numerals or corresponding reference numerals to simplify or omit an explanation.

Figure 23:
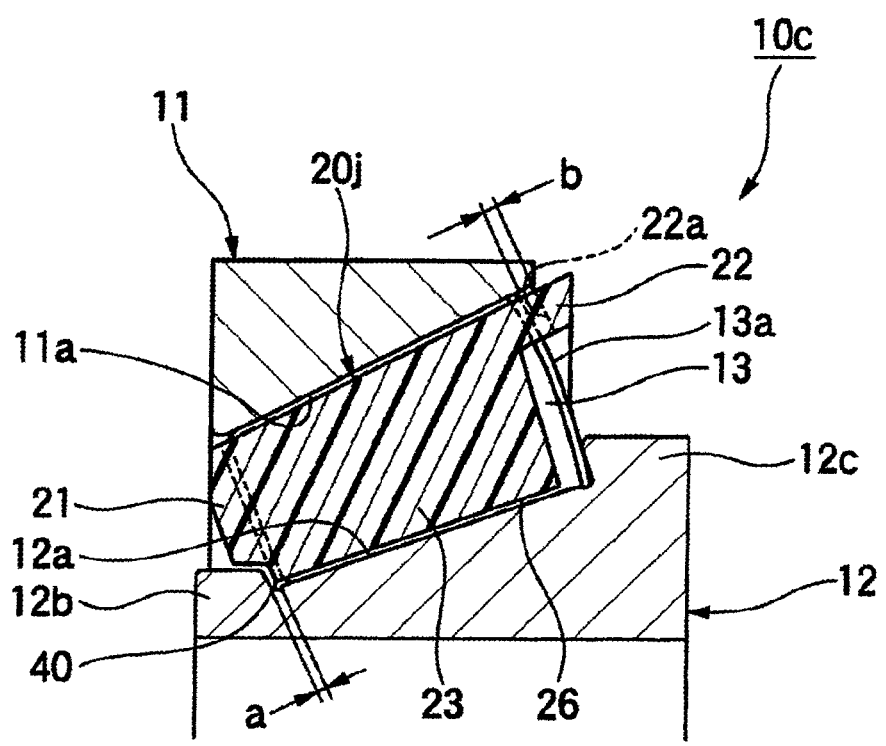
FIG. 23 is a longitudinally sectional view of a tapered roller bearing according to a fifth exemplary embodiment of the present invention.

As shown in FIG. 23, a cage 20j of the fifth exemplary embodiment includes a projection 40 which can regulate an axial movement of the cage 20j as in the second exemplary embodiment in the structure of the cage 20 of the first exemplary embodiment. In this case, a gap a between the projection 40 and a small flange 12b of an inner ring 12 is set to be smaller than a gap b between a head 13a of a tapered roller 13 and an inner side surface 22a of a large diameter annular portion 22 of the cage 20j (a<b).

Figure 24:
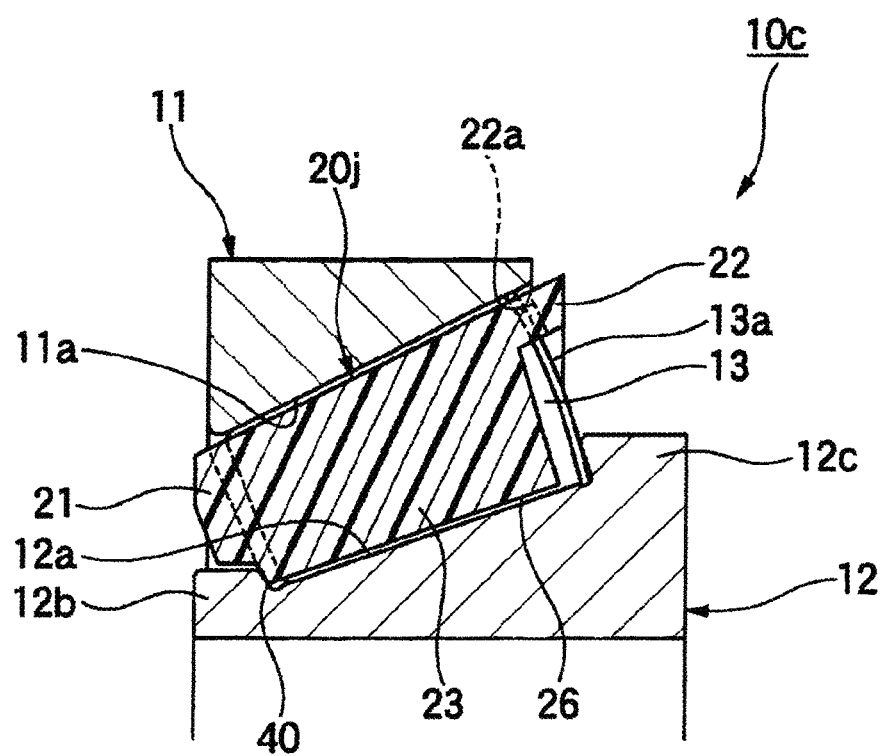
FIG. 24 is a longitudinally sectional view showing a state that a cage of the tapered roller bearing shown in FIG. 23 moves to a small diameter annular portion side.
Figure 25A:
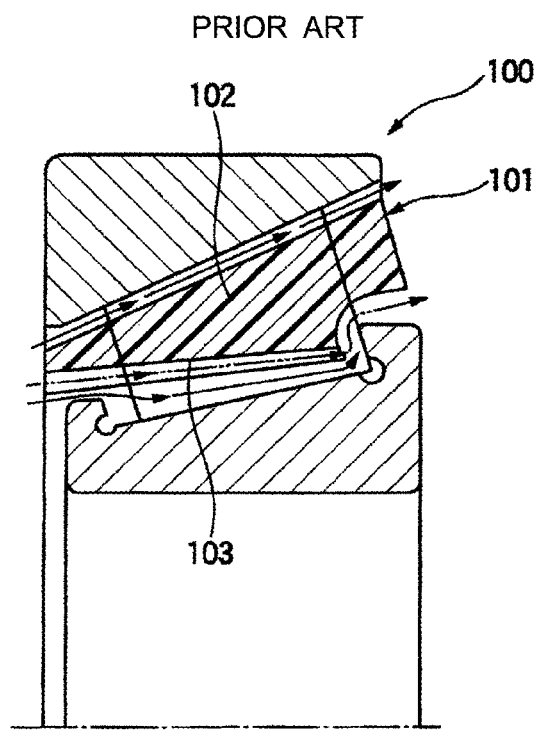
FIG. 25(a) and FIG. 25(b) are views showing a cage of a conventional tapered roller bearing.
Figure 25B:
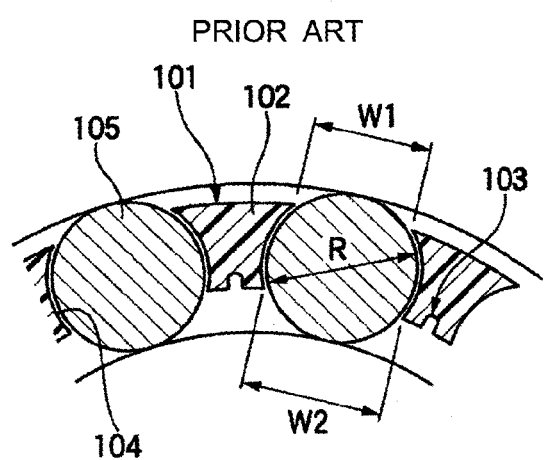

In the tapered roller bearing 10c having such a cage 20j, as shown in FIG. 24, even when the cage 20j moves to the small flange 12b during a rotation so that the projection 40 comes into contact with the small flange 12b of the inner ring 12, the head 13a of the tapered roller 13 does not come into contact with the inner side surface 22a of the large diameter annular portion 22 of the cage 20 to ensure the gap. Accordingly, an oil film adhering to the head 13a of the tapered roller 13 is not scraped by the large diameter annular portion 22 of the cage 20j. Thus, a contact part of a large flange 12c of the inner ring 12 and the head 13a of the tapered roller 13 is effectively lubricated to prevent a heat-seizure. Since other structures and operations are the same as those of the cage 20 of the first exemplary embodiment, an explanation thereof will be omitted.

The present invention is not limited to the exemplary embodiments described above, and modifications and improvements may be optionally made therein.

The present application is based on Japanese Patent Application filed on Jul. 8, 2008 (JP 2008-178218) and Japanese Patent Application filed on May, 21, 2009 (JP 2009-123143), and the entire contents of which are incorporated herein by reference.

The invention claimed is:

1. A tapered roller bearing resin cage comprising a small diameter annular portion, a large diameter annular portion, and a plurality of bar portions arranged at intervals in a circumferential direction to connect the annular portions, wherein the large diameter annular portion has a larger diameter than the small diameter annular portion, pockets for holding tapered rollers being formed between the annular portions and adjacent ones of the bar portions, wherein each of the bar portions comprises a pair of circumferentially-directed side surfaces, each comprising a roller guide surface, and an inner-side inner peripheral surface, a circumferential width of the inner-side inner peripheral surface being smaller on a side of the large diameter annular portion than a circumferential width on a side of the small diameter annular portion, wherein each of the pockets has a roller retaining region in which a radially outer side pocket width and a radially inner side pocket width between the opposed circumferentially-directed side surfaces of the adjacent bar portions are smaller than a diameter of each tapered roller, wherein the roller guide surface is configured as a flat surface, wherein each of the circumferentially-directed side surfaces comprises a curved surface disposed radially inward of the roller guide surface, wherein a circumferential gap between each tapered roller and a boundary of the curved surface and the inner-side inner peripheral surface at an edge of the boundary on a large diameter side is equal to or larger than the circumferential gap at a remaining part of the boundary on a small diameter side, so as to allow each tapered roller to shift radially inward when attaching each tapered roller to the pocket in an axial direction from the side of the large diameter annular portion, wherein the large diameter annular portion is formed with recessed portions on an inner peripheral surface and centrally located between the adjacent ones of the bar portions, so as to prevent an interference of each tapered roller with the large diameter annular portion when attaching each tapered roller to the pocket in the axial direction from the side of the large diameter annular portion, wherein the recessed portions extend in the axial direction from one axial side of the large diameter annular portion to another axial side thereof such that the recessed portions are opened at both axial sides, and wherein the large diameter annular portion is provided radially outward of the roller guide surface.

2. A tapered roller bearing comprising:

an outer ring having an outer ring raceway surface on an inner peripheral surface;

an inner ring having an inner ring raceway surface on an outer peripheral surface, and a small flange and a large flange on both sides of the inner ring raceway surface in an axial direction;

a plurality of tapered rollers rollably arranged between the outer ring raceway surface and the inner ring raceway surface; and a resin cage, wherein the resin cage comprises a small diameter annular portion, a large diameter annular portion, and a plurality of bar portions arranged at intervals in a circumferential direction to connect the annular portions, pockets for holding the tapered rollers being formed between the annular portions and adjacent ones of the bar portions, wherein each of the bar portions comprises a pair of circumferentially-directed side surfaces, each comprising a roller guide surface, and an inner-side inner peripheral surface, a circumferential width of the inner-side inner peripheral surface being smaller on a side of the large diameter annular portion than a circumferential width on a side of the small diameter annular portion, wherein each of the pockets has a roller retaining region in which a radially outer side pocket width and a radially inner side pocket width between the opposed circumferentially-directed side surfaces of the adjacent bar portions are smaller than a diameter of each tapered roller, wherein the roller guide surface is configured as a flat surface, wherein each of the circumferentially-directed side surfaces comprises a curved surface disposed radially inward of the roller guide surface, wherein a circumferential gap between the each tapered roller and a boundary of the curved surface and the inner-side inner peripheral surface at an edge of the boundary on a large diameter side is equal to or larger than the circumferential gap at a remaining part of the boundary on a small diameter side, so as to allow each tapered roller to shift radially inward when attaching each tapered roller to the pocket in the axial direction from the side of the large diameter annular portion, and wherein the large diameter annular portion is formed with recessed portions on an inner peripheral surface and centrally located between the adjacent ones of the bar portions, so as to prevent an interference of each tapered roller with the large diameter annular portion when attaching each tapered roller to the pocket in the axial direction from the side of the large diameter annular portion.

* * * * *